(12) United States Patent
Shaefer et al.

(10) Patent No.: US 9,881,699 B2
(45) Date of Patent: Jan. 30, 2018

(54) CELLULAR STRUCTURES WITH INTERCONNECTED MICROCHANNELS

(71) Applicants: Robert Shahram Shaefer, Camarillo, CA (US); Nasr M. Ghoniem, Los Angeles, CA (US); Brian Williams, Camarillo, CA (US)

(72) Inventors: Robert Shahram Shaefer, Camarillo, CA (US); Nasr M. Ghoniem, Los Angeles, CA (US); Brian Williams, Camarillo, CA (US)

(73) Assignees: The Regents of the University of California, Oakland, CA (US); Ultramet, Pacoima, CA (US)

( * ) Notice: Subject to any disclaimer, the term of this patent is extended or adjusted under 35 U.S.C. 154(b) by 588 days.

(21) Appl. No.: 14/486,938

(22) Filed: Sep. 15, 2014

(65) Prior Publication Data

US 2015/0235717 A1    Aug. 20, 2015

Related U.S. Application Data

(60) Provisional application No. 61/878,534, filed on Sep. 16, 2013.

(51) Int. Cl.
*B29C 59/00* (2006.01)
*G21B 1/13* (2006.01)
*C01B 33/32* (2006.01)

(52) U.S. Cl.
CPC .............. *G21B 1/13* (2013.01); *C01B 33/32* (2013.01); *Y02E 30/128* (2013.01); *Y10T 428/24997* (2015.04)

(58) Field of Classification Search
CPC ............ G21B 1/13; C01B 33/32; C01D 15/02
See application file for complete search history.

(56) References Cited

U.S. PATENT DOCUMENTS 5,154,373 A    10/1992  Scott
5,205,970 A *  4/1993  Brun ..................... C04B 35/573
                                                    264/340

(Continued)

OTHER PUBLICATIONS

Sharafat et al., "Breeder Foam: An Innovative Low Porosity Solid Breeder Material," Fusion Engineering and Design 81 (2006) 455-460.*

(Continued)

*Primary Examiner* — Michael N Orlando
*Assistant Examiner* — Cynthia Schaller
(74) *Attorney, Agent, or Firm* — Christensen O'Connor Johnson Kindness PLLC

(57) ABSTRACT

A method for fabricating a cellular tritium breeder component includes obtaining a reticulated carbon foam skeleton comprising a network of interconnected ligaments. The foam skeleton is then melt-infiltrated with a tritium breeder material, for example, lithium zirconate or lithium titanate. The foam skeleton is then removed to define a cellular breeder component having a network of interconnected tritium purge channels. In an embodiment the ligaments of the foam skeleton are enlarged by adding carbon using chemical vapor infiltration (CVI) prior to melt-infiltration. In an embodiment the foam skeleton is coated with a refractory material, for example, tungsten, prior to melt infiltration.

19 Claims, 2 Drawing Sheets

(56) References Cited

U.S. PATENT DOCUMENTS

| | | | |
|---|---|---|---|
| 5,225,153 A | 7/1993 | Yamada | |
| 5,759,930 A | 6/1998 | Donne | |
| 6,103,149 A | 8/2000 | Stankiewicz | |
| 6,185,810 B1 | 2/2001 | Gubser | |
| 6,929,866 B1 | 8/2005 | Williams | |
| 7,022,165 B2 | 4/2006 | Paglieri | |
| 7,297,368 B2 | 11/2007 | Williams | |
| 8,243,871 B2 | 8/2012 | Hrovat | |
| 8,303,883 B2 * | 11/2012 | Landingham | C01B 3/0026 264/134 |
| 2014/0025179 A1 | 1/2014 | Fortini | |

OTHER PUBLICATIONS

Sharafat et al., "Micro-Engineered First Wall Tungsten Armor for High Average Power Laser Fusion Energy Systems," Journal of Nuclear Materials 347 (2005) 217-243.*

"Selected 2011 Web Pages of www.ultramet.com," obtained from https://archive.org/web/.*

Ghoniem et al., Fusion Reactor Materials (Report on the Second American Nuclear Society Topical Meeting, Seattle, Washington, USA (Aug. 9-12, 1981) 977-984.*

* cited by examiner

CELLULAR STRUCTURES WITH INTERCONNECTED MICROCHANNELS

CROSS-REFERENCE TO RELATED APPLICATION

This application claims the benefit of Provisional Application No. 61/878,534, filed Sep. 16, 2013, the entire disclosure of said application is hereby incorporated by reference herein.

STATEMENT OF GOVERNMENT LICENSE RIGHTS

This invention was made with Government support under contract number DE-SC0007495 awarded by the U.S. Department of Energy. The Government has certain rights in the invention.

BACKGROUND

Nuclear fusion reactors hold promise to supplant the need for increasingly scarce fossil fuel energy resources. Fusion power with its low generation of radioactive waste is believed to be an ideal candidate for large-scale energy generation. Although many fusion reactions have been proposed, leading fuels considered for fusion power generation are isotopes of hydrogen, namely deuterium and tritium. Other reactions involving helium$^3$ are also under consideration. A leading fusion reaction for practical energy generation, referred to as the D-T fusion reaction, involves fusing deuterium and tritium atoms to produce helium and high energy neutrons. However, due to its short half-life tritium is difficult to find, and expensive. The D-T fusion reactors typically include some mechanism for breeding tritium from lithium.

For example, an international megaproject referred to as ITER is currently underway to engineer and build a nuclear fusion reactor that implements a D-T fusion reaction in a tokamak device configured to magnetically confine plasma in a toroidal chamber.

The ITER D-T fusion reactor system includes a tritium breeder blanket that performs two critical functions: (i) transforming the neutron energy generated by the D-T fusion into heat, and (ii) breeding tritium for tritium self-sufficient plasma operation.

Tritium is generated in the blanket by neutron transmutation reactions with lithium isotopes. The lithium in the blanket may be in liquid form, for example, as a eutectic alloy such as $Li_{17}Pb_{83}$, or in solid form, for example, a lithium-ceramic material sometimes called a solid breeder. The neutrons originate from the reactor plasma and enter the blanket with high energy (e.g., about 14.7 MeV). In practical energy systems, the D-T fuel cycle requires the breeding of tritium from lithium using one of the following reactions:

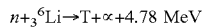

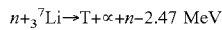

Where,
n=neutron,
T=tritium,
∝=helium ion.

The first reaction occurs at any energy and releases 4.78 MeV of kinetic energy per reaction. The second reaction is a threshold reaction and requires an incident neutron energy in excess of 2.47 MeV. A neutron multiplier, for example beryllium, may be used to increase the number of neutrons available to interact with lithium to produce tritium.

Current tritium breeder blankets use sphere pack or pebble bed technology, which imposes severe design and operational limitations. Pebble beds comprise densely packed micro spheres made of metallic or ceramic constituents.

However, conventional sphere-packed configurations impose stringent design and operational limitations on solid breeder blankets due to (1) a low effective thermal conductivity, (2) a maximum breeder packing fraction of ~65%, (3) a relatively narrow operating temperature window (e.g., ~325° C. to 925° C. for Li4SiO4), (4) uncertainty in pebble bed-wall interaction, particularly for cyclic operations, (5) fragmentation and failure of breeder pebbles due to high pebble contact stresses, (6) solid breeder pebble bed deformations due to thermal creep, swelling, cracking/fragmentation, and (7) marginal tritium breeding ratios, because temperature control of the breeder requires high structure-to-breeder volume fractions.

Tritium production and release characteristics are critical to the operation of a solid breeder blanket. At 400° C. the residence time of tritium can be as long as two hours in typical ceramic pebbles. At high Li burn-up, tritium release rates depend on the state of the interconnected pores and the size of the grain of the breeder material itself. The temperature gradient imposed in the breeder section can cause differential stresses and may lead to cracking and fragmentation of breeder pebbles, which can result in loss of breeder temperature control and may block the flow of tritium purge gas, leading to excess tritium trapping and unacceptable high levels of stagnant tritium inventory. A high tritium inventory in the blanket may become a threat to safety, and may require early removal of the blanket.

Because of its configuration and brittle nature, the thermo-mechanical behavior of the sphere-packed breeder bed represents key challenges for developing this line of blankets. This is due to, in part, that the tritium release characteristics and inventory in ceramic breeders strongly depend on temperatures. Operating ceramic breeder pebbles beyond the upper limit can induce sintering, which traps tritium leading to a huge tritium inventory. Furthermore, differential thermal expansion due to temperature gradients creates stress/strain conditions that affect the breeder effective thermal conductance and subsequent temperature distribution. These temperature-driven processes impose operating limits on the ceramic breeder region temperatures, and require acceptable accuracy in the prediction of the spatial and temporal temperature profiles over the lifetime of the blanket.

A novel alternative to pebble bed tritium breeder blankets is disclosed herein. In particular, a new class of solid breeder materials with an interconnected network of microchannels is disclosed. In these new materials, the internal network of interconnected microchannels provide large internal surface areas for efficient release of reactants, flow of reagents, catalytic reactions, or extraction of nuclear gaseous transmutation products, such as tritium in fusion reactor solid breeder materials or gaseous fission products produced in fuel rods in fission power reactors.

The materials disclosed herein have the following advantages: high reliability, standalone structure, network of interconnected microchannels for efficient release of tritium or flow of reagents or reaction products, high ceramic density, high reaction and/or tritium production rates, high tritium or other gaseous products release rates, high thermal conductivity, elimination of the large temperature drops between pebble bed and containment structure, elimination of pore closures due to sintering under operation, and elimination of pebble failure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for fabricating a tritium breeder component includes manufacturing or otherwise obtaining a reticulated carbon foam skeleton. The carbon foam skeleton is an open cell foam defining a network of interconnected ligaments. A melt-infiltration process is used to infiltrate the carbon foam skeleton with a tritium breeder material, which is then allowed to solidify. The carbon foam skeleton is then removed, for example using an oxidation process, to thereby define a three-dimensional tritium breeder component having a network of interconnected microchannels.

In an embodiment the carbon foam skeleton is a reticulated vitreous carbon foam, and the tritium breeder material comprises lithium zirconate, lithium titanate, lithium orthosilicate, lithium oxide, or combinations thereof. For example, the foam skeleton may have an open porosity between 96 vol % and 98 vol %.

In an embodiment the diameter or transverse dimension of the interconnected ligaments is increased prior to melt-infiltrating the skeleton by adding carbon foam to the skeleton, for example by chemical vapor infiltration.

In an embodiment the carbon foam skeleton is coated with a refractory material prior to melt-infiltration the skeleton, for example the refractory material may be a refractory metal, such as tungsten. In a particular embodiment the refractory material is applied by chemical vapor infiltration.

In an embodiment the foam skeleton channels define a plurality of open cells that define at least 50 pores per inch, and preferably between 65 and 100 pores per inch.

In an embodiment the melt-infiltration is performed in an inert atmosphere, for example in an argon atmosphere.

In an embodiment the melt-infiltration is performed at a reduced external pressure of less than 0.9 atmospheres.

In an environment the foam skeleton is formed into a desired shape prior to performing the step of melt-infiltration.

A breeder material is disclosed formed by manufacturing or otherwise obtaining an open-cell reticulated carbon foam skeleton defining a network of interconnected ligaments. A melt-infiltration process is used to infiltrate the carbon foam skeleton with a tritium breeder material, which is then allowed to solidify. The carbon foam skeleton is then removed, for example using an oxidation process, to thereby define a three-dimensional tritium breeder component having a network of interconnected microchannels

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A new class of cellular materials having an interconnected network of microchannels, and a method for making such materials, is disclosed. The internal network of interconnected microchannels of these cellular materials provide large internal surface areas for efficient release of reactants, flow of reagents, catalytic reactions, or extraction of nuclear gaseous transmutation products, such as tritium in fusion or fission power reactors. In currently preferred embodiments the interconnected microchannels formed in accordance with the present disclosure may have a characteristic transverse dimension in the range of about 30 microns to about 500 microns.

In particular embodiments, the material may provide a cellular solid breeder material suitable for use in a breeder test blanket module (TBM) for a D-T fusion nuclear reactor. In a D-T fusion reactor the solid blanket TBM converts the energy from neutrons generated in the fusion reaction into thermal energy, and generates tritium, which is collected and returned as fuel for the reactor. These new materials may be used to replace current pebble bed breeder blankets made of ceramic or metallic constituents.

Example 1—Solid Breeder Blanket Construction

In a current embodiment, a solid breeder structure comprises a ceramic tritium breeder component with an interconnected network of tritium purge microchannels. Exemplary breeder materials include lithium zirconate ($Li_2ZrO_3$), lithium titanate ($Li_2TiO_3$), lithium orthosilicate ($Li_4SiO_4$), and lithium oxide ($Li_2O$). Other candidate solid breeder materials (e.g., $\gamma$-$LiAlO_2$, $Li_5AlO_4$, $Li_2SiO_3$, $Li_8ZrO_6$, etc.) are known in the art, and are contemplated by the present invention.

Figure 1:
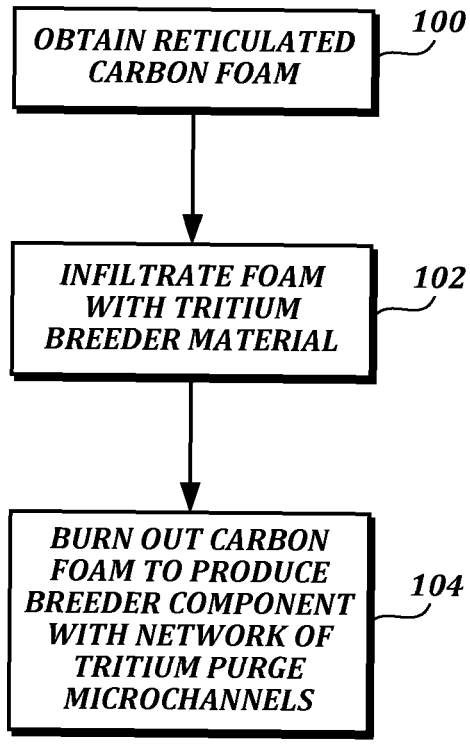
FIG. 1 is a flow chart outlining a method according to a first embodiment of the present invention.

In this embodiment and as illustrated in FIG. 1, the new breeder material is constructed in a method that includes three steps. A reticulated carbon foam skeleton is obtained or generated 100. For example, reticulated vitreous carbon (RVC) foams are well known in the art, and may be readily obtained, for example, from Ultramet, a California corporation d/b/a Ultramet Advanced Materials Solutions, in Pacoima, Calif. The RVC foam may be obtained in a broad variety of shapes and pore sizes, and has a three-dimensional open-cell structure with 97% open porosity. Other sources and methods of making a reticulated carbon foam will be known to persons of skill in the art.

Although the cell size of RVC foam can be varied, for example, from 3 to 100 pores per linear inch ("ppi"), it is anticipated that a small pore foam, e.g., 65 ppi, 85 ppi, or 100 ppi, will be used for this application to minimize the tritium diffusion distance. In a currently preferred embodiment the tritium diffusion distance is about 400 microns or less.

A typical cell size (i.e., the maximum space between ligaments) for 100-ppi RVC foam is approximately 500 μm, which would produce a tritium diffusion mean-free-path of about 250 μm. Compressed foam can be produced in which the pore size is as low as 100 microns, thus providing even shorter tritium diffusion path length for release.

Referring again to FIG. 1, a selected tritium breeder material is infiltrated into the porous carbon foam skeleton, for example, by melt infiltration 102. As noted above, exemplary breeder materials include (but are not restricted to) lithium zirconate, lithium titanate, lithium orthosilicate, and lithium oxide. In one currently preferred embodiment the breeder material is lithium titanate. In another currently preferred embodiment the breeder material is lithium zirconate.

In a currently preferred embodiment the melt-infiltration is conducted in an inert atmosphere, for example, in a cover gas comprising argon, and at a reduced pressure, for example a pressure of less than 0.9 atm, and in a current embodiment at a pressure between about 0.7 atm to 0.9 atm. The breeder material is heated to a desired melt temperature to permit infiltration of the liquid breeder material, while maintaining the integrity of the foam skeleton. The breeder material is heated to a temperature such that the viscosity of the liquid is low enough to effectively infiltrate the foam skeleton, and at a temperature that does not cause undue reaction or damage to the foam skeleton. For example, the $Li_2ZrO_3$ breeder material may be heated to a temperature between about 1,700° C. and 1,900° C. The melt-infiltration in this embodiment is accomplished by wicking.

In an exemplary embodiment a RVC foam preform skeleton is formed or cut to a desired shape. The skeleton is melt-infiltrated with molten ceramic to form a dense matrix material through and around the foam skeleton. The melt-infiltration may be accomplished in a single infiltration step to completely fill the void-space in the skeleton. In exemplary embodiments components up to 30 cm square by 7 cm thick are fabricated.

The carbon foam skeleton is then removed, for example, by burning or oxidation 104, to thereby produce a cellular breeder component, i.e., a component comprising a solid breeder material and having an interconnected network of microchannels that extend through component. For example, after the melt-infiltration of the foam is completed, the component may be heated for a period of time, for example, at a temperature of 500° C.-1,500° C. in air (or other oxygenated gas) for a time sufficient to permit oxygenation of the carbon foam. It is contemplated that the carbon foam skeleton may alternatively be removed using a conventional electroetching process.

For example, the open-cell structure of the RVC foam has a generally dodecahedral unit cell geometry with twelve pentagonal pores or openings into each cell. The edges of the cells define a ligament of the open-cell structure. The interconnected network of microchannels in the cellular breeder component (after removal of the carbon foam skeleton) comprises a generally dodecahedral network. The resulting structure is a cellular solid tritium breeder component or blanket comprising a tritium breeder material having a three-dimensional interconnected network of finely spaced tritium purge channels therethrough.

After the carbon foam skeleton is removed, the breeder component comprises a monolithic structure having an interconnected network of microchannels. In use, neutron irradiation converts lithium in the breeder material into tritium. The tritium produced needs to be continuously purged from the cellular breeder component. The integrity of the interconnected microchannels is therefore critical for purging tritium from the breeder component. Prior studies of neutron irradiated and sintered lithium orthosilicate pebble bed breeder components, for example, have found that irradiated pebbles maintain a crush load strength comparable to that of non-irradiated pebbles. However, sintering of pebbles may result in closure of interconnected openings and thus trap tritium.

Optionally, silicon oxide may be added to the melt-infusion breeder material to enhance the mechanical integrity of the cellular breeder component.

This novel method and material provides many advantages over conventional pebble bed breeder blankets, as discussed in more detail in U.S. Provisional Patent Application No. 61/878,534, which is incorporated by reference above. For example, a breeder blanket in accordance with the present invention may be fabricated to have a breeder material volumetric density greater than 80 percent. In a currently preferred embodiment the breeder material volumetric density is between 70 percent and 95 percent. In another preferred embodiment the breeder material volumetric density is between 75 percent and 85 percent.

Also, the network of microchannels, or internal purge channels, may be engineered to provide a desired internal surface area and, in particular, a much greater surface area per unit volume than conventional pebble bed breeder blankets. Thermal and structural performance is also improved.

Example 2

Figure 2:
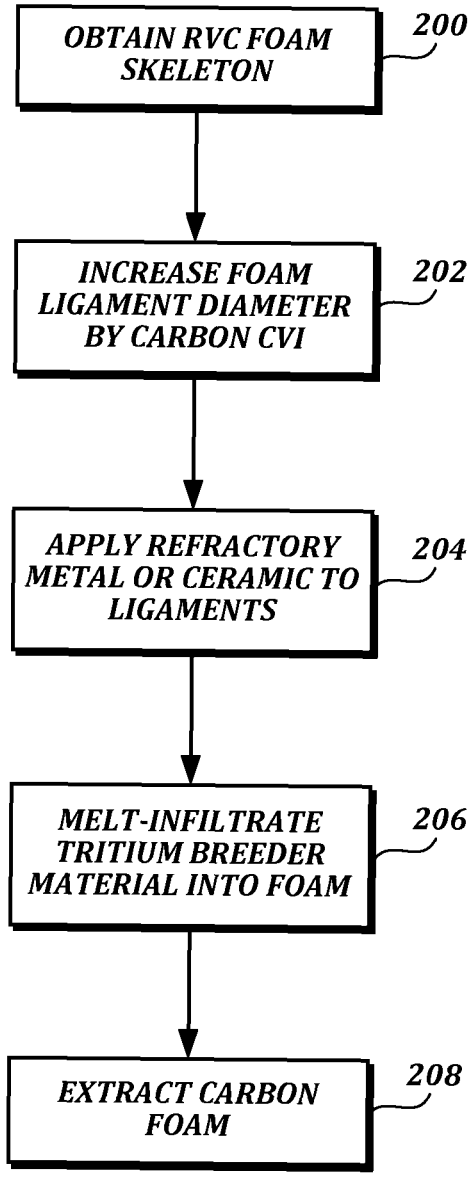
FIG. 2 is a flow chart outlining a method in accordance with a second embodiment of the invention.

FIG. 2 is a process chart for a producing a solid breeder structure in accordance with another embodiment of the present invention. In this embodiment a cellular solid breeder component comprising lithium titanate or lithium zirconate with a network of micro-engineered interconnected microchannels for rapid tritium release and purging is disclosed. Alternatively, the breeder material may be any other suitable lithium compound, as identified above. In this embodiment the new breeder structure has a breeder material volume density of between 84 and 90 percent, a thermal conductivity as high as 2.05 W/m-K, and a maximum tritium diffusion length to a purge microchannel of ~90 μm.

The fabrication method is shown schematically in FIG. 2. An open-cell carbon-foam skeleton is obtained or fabricated 200. The foam skeleton is preferably preformed to a desired shape for the cellular breeder component. For example, the foam skeleton may be an RVC foam having a density of about 3 vol. % (i.e., 2-4 vol. %), e.g., an open porosity of about 97 vol. % (i.e., 96-98 vol. %). The foam skeleton may be substantially in accordance with the foam skeleton described above with reference to FIG. 1. A small pore foam, e.g., a foam having a ppi greater than 50 is currently preferred to minimize the tritium diffusion distance within the solid breeder material. Exemplary foam pore sizes are 65 ppi, 85 ppi, or 100 ppi. In a currently preferred embodiment the tritium diffusion distance is about 400 microns or less The transverse dimension (e.g., the diameter) of the ligaments in the foam skeleton are then increased 202, for example, by carbon chemical vapor infiltration (CVI) of the foam skeleton. CVI is well known in the art. In a particular embodiment, the CVI is conducted to increase the volume density of the foam skeleton from about 2 vol. % to between 10 and 20 vol. %.

The built-up foam skeleton is then provided with a coating or interlayer of a refractory material, for example, with tungsten 204, again by CVI. The refractory coating protects the carbon foam skeleton from reacting with the molten breeder material during the melt-infiltration of the foam skeleton. The refractory coating may also be selected to help wick or draw the breeder material into the foam skeleton.

Tungsten has been found to have advantages over other refractory materials. Without wishing to be bound by theory, it is believed that a portion of the tungsten interlayer exits with the oxidized carbon when the foam is removed, and a portion of the tungsten may diffuse into the breeder material. Therefore, it is believed preferable to select a refractory material such as tungsten that does not significantly interfere with the diffusion of tritium from the breeder material. Although tungsten is currently a preferred refractory material, other refractory metals or refractory ceramic materials are also contemplated, and will be apparent to persons of skill in the art based on the teachings herein. In a currently preferred embodiment the refractory material is applied to comprise 2 to 4 vol. % of the foam skeleton.

The foam skeleton with the added carbon and refractory coating is then melt-infiltrated with the desired breeder material 206, generally as discussed above.

Figure 3:
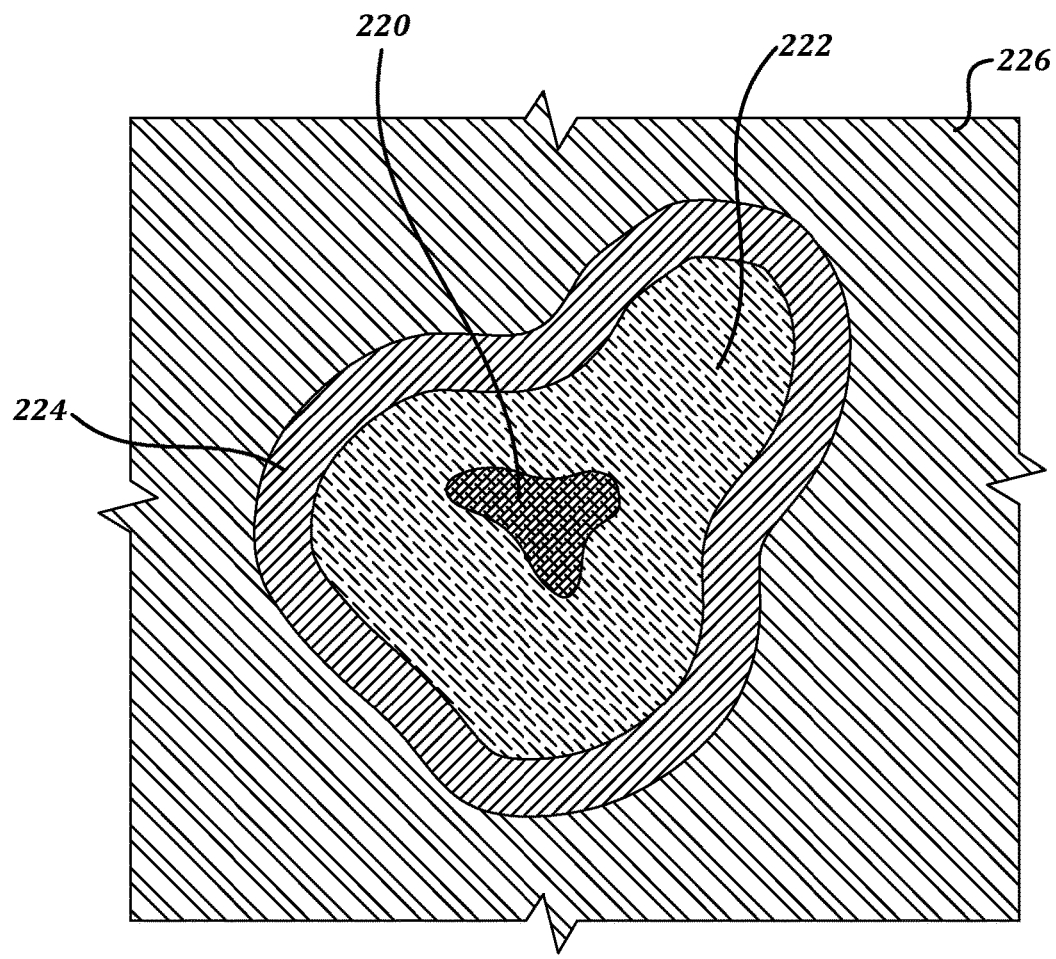
FIG. 3 is a fragmentary diagram illustrating a cross section through one ligament of a carbon foam for a component fabricated in accordance with the method of FIG. 2, after melt-infiltration of a breeder material, and prior to removal of the carbon foam skeleton.

FIG. 3 illustrates diagrammatically a cross-section through a single ligament of the material after melt-infiltration of the breeder material, and before burn-out or other removal of the carbon. The carbon ligament 300 from the reticulated vitreous carbon 220 is surrounded by a pyrolytic carbon coating 222 that was deposited, for example, by CVI. A refractory tungsten layer 224 over the pyrolytic carbon 222 is applied, for example, with a second CVI step, and it protects the carbon from reacting with the breeder material 226 during (or after) the melt-infiltration step. It will be appreciated that after the carbon is removed, e.g., by oxidation, a microchannel remains in the breeder material 226. The resulting network of microchannels correspond to the cellular structure defined by the RVC foam. For example, in some applications a dodecahedral network of interconnected microchannels may be formed. The dimensions and spacing of the microchannels are selectable by the selection and/or fabrication of the foam skeleton and the application of the pyrolytic carbon.

Then the carbon foam skeleton is removed 208, for example, by oxidizing the carbon as also described above, or by elecroetching.

As will be apparent to persons of skill in the art, the methods disclosed above may be applied to the fabrication of cellular components, including for example cellular metallic and cermet components useful for nuclear power production. It is contemplated, for example, that a cellular uranium-containing metal may be fabricated with an interconnected network of microchannels. Beryllium, and in particular beryllium oxide is useful for many applications that require a material having an excellent heat conductance, with high strength and hardness, and a very high melting point. Beryllium oxide may also be useful in increasing the thermal conductivity of uranium dioxide nuclear fuel pellets.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for fabricating a cellular tritium breeder component comprising:
    obtaining a reticulated carbon foam skeleton, wherein the carbon foam skeleton comprises a network of interconnected ligaments;
    melt-infiltrating the carbon foam skeleton with a tritium breeder material to fill void space in the network of interconnecting ligaments;
    allowing the breeder material to solidify; and
    removing the carbon foam skeleton such that the breeder material defines a three-dimensional component containing a network of interconnected channels therethrough,
    wherein the tritium breeder material volumetric density in the breeder component is between 70 percent and 95 percent.

2. The method of claim 1, wherein the breeder material comprises one or more of lithium zirconate, lithium titanate, lithium orthosilicate, and lithium oxide.

3. The method of claim 1, wherein the carbon foam skeleton network of interconnected ligaments comprises a reticulated vitreous carbon foam.

4. The method of claim 1, wherein the carbon foam skeleton comprises a foam skeleton having an open porosity between 96 vol. % and 98 vol. %.

5. The method of claim 1, further comprising enlarging the transverse dimension of the interconnected ligaments before melt-infiltrating the carbon foam skeleton by adding carbon to the carbon foam skeleton.

6. The method of claim 5, wherein the carbon is added to the carbon foam skeleton by chemical vapor infiltration.

7. The method of claim 5, wherein the carbon foam skeleton has a volume density between 10 vol. % and 20 vol. % after adding the carbon to the carbon foam skeleton.

8. The method of claim 1, further comprising coating the carbon foam skeleton with a refractory material prior to melt-infiltrating the carbon foam skeleton.

9. The method of claim 8, wherein the refractory material comprises a refractory metal.

10. The method of claim 9, wherein the refractory material comprises tungsten.

11. The method of claim 8, wherein coating the carbon foam skeleton is accomplished by chemical vapor infiltration.

12. The method of claim 4, further comprising coating the carbon foam skeleton with a refractory metal prior to melt-infiltrating the carbon foam skeleton.

13. The method of claim 12, wherein the refractory metal comprises tungsten.

14. The method of claim 1, wherein the foam skeleton defines a plurality of open cells, and further wherein the open cells define at least 50 pores per inch.

15. The method of claim 1, wherein the foam skeleton defines a plurality of open cells, and further wherein the open cells define 65 to 100 pores per inch.

16. The method of claim 1, wherein the step of melt-infiltrating the carbon foam skeleton is performed in an inert atmosphere.

17. The method of claim 16, wherein the inert atmosphere comprises argon.

18. The method of claim 1, further comprising the step of forming the foam skeleton into a desired shape before melt-infiltrating the carbon foam skeleton.

19. The method of claim 1, wherein the step of melt-infiltrating the carbon foam skeleton is performed at a pressure less than 0.9 atmospheres.

* * * * *